(12) United States Patent
Serban et al.

(10) Patent No.: US 8,062,509 B2
(45) Date of Patent: Nov. 22, 2011

(54) PROCESS, SYSTEM AND FACILITY FOR DESORBING

(75) Inventors: Manuela Serban, Glenview, IL (US); Christopher D. Gosling, Roselle, IL (US); Maureen L. Bricker, Buffalo Grove, IL (US)

(73) Assignee: UOP LLC, Des Plaines, IL (US)

( * ) Notice: Subject to any disclaimer, the term of this patent is extended or adjusted under 35 U.S.C. 154(b) by 476 days.

(21) Appl. No.: 12/241,459

(22) Filed: Sep. 30, 2008

(65) Prior Publication Data

US 2010/0078359 A1    Apr. 1, 2010

(51) Int. Cl.
*C07C 7/12*    (2006.01)
(52) U.S. Cl. .................................. 208/310 R
(58) Field of Classification Search .......... 208/177, 208/299, 305, 308, 310 R, 310 Z
See application file for complete search history.

(56) References Cited

U.S. PATENT DOCUMENTS

| | | | | |
|---|---|---|---|---|
| 2,288,866 | A | * | 7/1942 | Hoog ............................. 208/87 |
| 3,204,006 | A | * | 8/1965 | Broughton ...................... 208/89 |
| 3,905,892 | A | | 9/1975 | Gregoli et al. |
| 4,087,354 | A | | 5/1978 | Hessler |
| 4,102,816 | A | | 7/1978 | Stalling et al. |
| 4,118,281 | A | | 10/1978 | Yan |
| 4,447,315 | A | | 5/1984 | Lamb et al. |
| 4,632,749 | A | | 12/1986 | Hilfman |
| 4,747,937 | A | | 5/1988 | Hilfman et al. |
| 4,804,457 | A | | 2/1989 | Ngan |
| 4,954,242 | A | | 9/1990 | Gruia |
| 5,124,023 | A | | 6/1992 | Bosserman et al. |
| 5,139,644 | A | | 8/1992 | Gruia |
| 5,139,646 | A | | 8/1992 | Gruia |
| 5,190,633 | A | | 3/1993 | Fetzer et al. |
| 5,464,526 | A | | 11/1995 | Saunders |
| 5,583,277 | A | | 12/1996 | Kuehl |
| 5,792,898 | A | | 8/1998 | Glover |
| 5,849,979 | A | | 12/1998 | Kalnes et al. |
| 6,563,010 | B1 | | 5/2003 | Liepa |
| 2006/0213808 | A1 | | 9/2006 | Barthelet et al. |
| 2006/0213809 | A1 | | 9/2006 | Barthelet et al. |

OTHER PUBLICATIONS

C. L. Yaws, Yaws' Thermophysical Properties of Chemicals and Hydrocarbons, Knovel, 2010.*
Karetina et al., Quantitative Determination of Polyarenes Adsorbed on the Surface of Carbon Black, Zhurnal Prikladnoi Khimii (Sankt-Peterburg, Russian Federation), 1988, vol. 61(5), Chemical Abstracts Accession No. 1988:604154; Document No. 109:204154, pp. 1098-1102.
Vershinin et al., Individual Composition of Polycyclic Arenes Adsorbed on the Surface of Carbon Black During its Production, Izvestiya Vysshikh Uchebnykh Zavedenii, Khimiya i Khimicheskaya Tekhnologiya, 1984, vol. 27(11), Chemical Abstracts Accession No. 1985:81022, Document No. 102:81022, pp. 1364-1366.

\* cited by examiner

*Primary Examiner* — In Suk Bullock
*Assistant Examiner* — Randy Boyer
(74) *Attorney, Agent, or Firm* — James C Paschall

(57) ABSTRACT

One exemplary embodiment can be a process for desorbing one or more polynuclear aromatics from at least one fraction from a hydrocracking zone using an adsorption zone. The adsorption zone can include first and second vessels. Generally, the process includes passing the at least one fraction from an effluent of the hydrocracking zone through the first vessel containing a first activated carbon, and passing a petroleum fraction boiling in the range of about 200-about 400° C. for desorbing the one or more polynuclear aromatics through the second vessel containing a second activated carbon.

19 Claims, 9 Drawing Sheets

PROCESS, SYSTEM AND FACILITY FOR DESORBING

FIELD OF THE INVENTION

This invention generally relates to a process, a system, and a facility for desorbing adsorbent beds.

DESCRIPTION OF THE RELATED ART

In hydrocracking processes, polynuclear aromatics (hereinafter may be abbreviated "PNAs") can form coke and foul units. Typically, PNAs include compounds having a plurality of fused aromatic rings and include compounds such as coronene and ovalene. As a result, it is desirable to remove PNAs from the recycle oil circuit of a hydrocracking unit.

Adsorbent beds may be utilized to remove polynuclear aromatics from such hydrocracking processes. After the adsorption capacity of the adsorbent is exhausted, typically the adsorbent is disposed. Unfortunately, such disposal can create unwanted waste, additional costs, and disposal issues such as environmental concerns. Thus, it would be beneficial to provide a process for reusing the spent adsorbent with minimum modification to an existing system.

SUMMARY OF THE INVENTION

One exemplary embodiment can be a process for desorbing one or more polynuclear aromatics from at least one fraction from a hydrocracking zone using an adsorption zone. The adsorption zone can include first and second vessels. Generally, the process includes passing the at least one fraction from an effluent of the hydrocracking zone through the first vessel containing a first activated carbon, and passing a petroleum fraction boiling in the range of about 200–about 400° C. for desorbing the one or more polynuclear aromatics through the second vessel containing a second activated carbon.

Another exemplary embodiment may be a system for adsorbing one or more polynuclear aromatics. Generally, the system includes an adsorption zone, which may receive at least one fraction from an effluent from a hydrocracking zone including one or more polynuclear aromatics adapted to pass through a first vessel containing a first adsorbent, and a light cycle oil for desorbing one or more polynuclear aromatics from a second adsorbent contained in a second vessel. Typically, the light cycle oil including one or more desorbed polynuclear aromatics exiting the second vessel is passed downstream of a fluid catalytic cracking zone.

Yet another exemplary embodiment can be a refining or petrochemical manufacturing facility. Generally, the facility includes an adsorption zone, a hydrocracking zone, and a first fractionation zone. An adsorption zone may be adapted to receive a recycle oil having up to about 10,000, ppm, by weight, of one or more polynuclear aromatics and a light cycle oil, and the adsorption zone is adapted to send the light cycle oil downstream of a fluid catalytic cracking zone. Also, the hydrocracking zone can be adapted to receive at least a portion of the recycle oil, in turn having no more than about 1,000, ppm, by weight, of one or more polynuclear aromatics from the adsorption zone and provide an effluent. The first fractionation zone may be adapted to receive at least a portion of the effluent and provide at least a portion of the recycle oil to the adsorption zone.

The embodiments disclosed herein permit the desorption of PNAs and regeneration of an adsorbent to allow its reuse. This regeneration, in turn, can reduce waste and associated disposal costs.

DEFINITIONS

As used herein, the term "stream" can be a stream including various hydrocarbon molecules, such as straight-chain, branched, or cyclic alkanes, alkenes, alkadienes, and alkynes, and optionally other substances, such as, gases, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3 . . . Cn where "n" represents the number of carbon atoms in the hydrocarbon molecule. Typically, one or more streams, in whole or in part, may be contained by a line or a pipe.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer or vessel, can further include one or more zones or sub-zones.

As used herein, the term "adsorption" can refer to the retention of a material in a bed containing an adsorbent by any chemical or physical interaction between the material in the bed, and includes, but is not limited to, adsorption, and/or absorption. The removal of the material from an adsorbent may be referred to herein as "desorption."

As used herein, the term "substantially" can mean at least about 90%, about 95%, or even about 99%, by weight.

As used herein, the term "at least one fraction" can mean a stream of, e.g., hydrocarbons that may or may not be a product of a fractionation zone.

DETAILED DESCRIPTION

Figure 1:
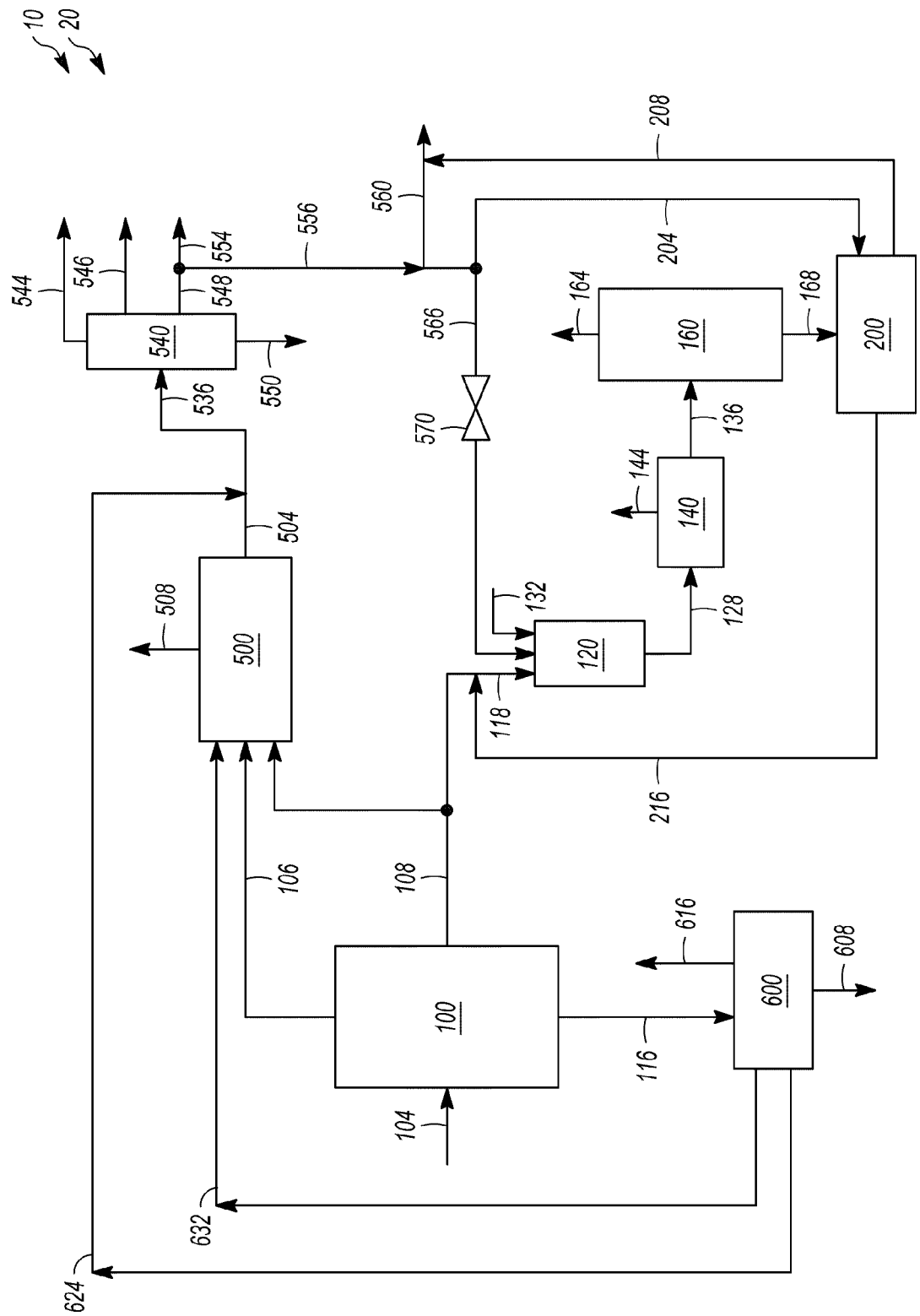
FIG. 1 is a schematic depiction of an exemplary refining or petrochemical manufacturing facility that includes an exemplary adsorption zone.

Referring to FIG. 1, an exemplary refining or petrochemical manufacturing facility 10 and system 20 are depicted. Generally, the refining or petrochemical manufacturing facility 10 can include a vacuum distillation zone 100, a hydrocracking zone 120, a separation zone 140, a first fractionation zone 160, an adsorption zone 200, a fluid catalytic cracking zone 500, a second fractionation zone 540, and a coking zone 600. The system 20 can include one or more zones of the facility 10.

The vacuum distillation zone 100 can include a vacuum distillation column that typically receives a bottom stream from a crude oil column as a feed 104. Usually, the feed 104 is an atmospheric gas oil (hereinafter may be abbreviated "AGO") having a boiling point range of about 200-about 380° C. Generally, the vacuum column is operated at a subatmospheric pressure. An exemplary vacuum distillation zone is disclosed U.S. Pat. No. 4,087,354. The vacuum distillation zone 100 can produce several streams, namely an overhead stream 106 typically including a light vacuum gas oil (hereinafter may be abbreviated "LVGO"), a side stream 108 usually including a vacuum gas oil (hereinafter may be abbreviated "VGO"), and a bottom stream 116 typically including a vacuum residue. The LVGO can have a boiling point range of about 230-about 450° C., the VGO may have a boiling point range of about 260, - about 500° C., and the vacuum residue can have an initial boiling point of at least about 530° C.

Generally, the hydrocracking zone 120 receives a feed 118. The feed 118 can include at least a portion of the VGO from the side stream 108 with another portion of the VGO sent to the fluid catalytic cracking zone 500. The feed 118 to the hydrocracking zone 120 may also include a portion of a recycle oil in a stream 216 from the adsorption zone 200, an LCO from a stream 566, and a coker gas oil from a stream 132 that can be obtained from the coking zone 600. The hydrocracking zone 120 can produce an effluent 128. The stream 216 can have less of one or more PNAs, by weight, than the effluent 128. Generally, the amount of PNAs in the stream 216 is reduced to a level to minimize coking and fouling in the hydrocracking facility 10. The stream 216 can have no more than about 10,000, ppm, by weight, preferably less than about 1,000, ppm, by weight, and optimally less than about 500, ppm, by weight, of one or more PNAs. In addition, the recycle oil may have a boiling point greater than about 260° C., and the coker gas oil may have a boiling point of about 220-about 620° C.

The hydrocracking zone 120 can include a hydrocracking reactor. The hydrocracking reactor can operate at any suitable condition, such as a pressure of about 700, kPa-about 21,000, kPa, a temperature of about 180-about 460° C., a liquid hourly space velocity (hereinafter may be abbreviated "LHSV") of about 0.2-about 20, hour$^{-1}$, and a hydrogen circulation rate of about 35-about 2,600, normal meter-cubed hydrogen/meter-cubed hydrocarbon. The hydrocracking reactor can contain a catalyst including at least one metal component, such as a Group VIII metal, e.g. as iron, cobalt, nickel, and/or platinum, and a Group VIB, such as molybdenum and/or magnesium, and a suitable refractory inorganic oxide carrier, such as alumina and/or silica. An exemplary hydrocracking zone is disclosed in U.S. Pat. No. 4,954,242. The hydrocracking zone 120 can produce the effluent 128 that can include a recycle oil.

The separation zone 140 can receive the effluent 128 and include a high pressure separator for removing a gas stream 144. Exemplary separation zones are disclosed in U.S. Pat. Nos. 4,447,315; 4,747,937; , and 5,124,023. The high pressure separator 140 can remove a gaseous stream 144 typically rich in hydrogen. Typically, a liquid portion 136 can be provided from the separation zone 140 to the first fractionation zone 160.

The first fractionation zone 160 can include one or more distillation columns for separating one or more fractions before sending an overhead stream 164 that can include a distillate such as a naphtha, and a bottoms stream 168 that typically includes a recycle oil having a boiling point greater than about 260° C. to the adsorption zone 200. The stream 168 can contain a level of PNAs greater than the stream 216, and may be at a sufficient level to create coking and fouling in the hydrocracking facility 10. Generally, the stream 168 can contain up to about 10,000, ppm, by weight, or more of one or more PNAs.

The adsorption zone 200 can receive the recycle oil stream 168 for removing one or more PNAs. The resultant stream 216 can include a recycle oil, as described above. In addition, the adsorption zone 200 can receive a stream 204 for desorbing that typically includes an LCO. The adsorption zone 200 will be described in greater detail hereinafter.

In addition, the refining or petrochemical manufacturing facility 10 can include a fluid catalytic cracking zone 500. Generally, the fluid catalytic cracking zone 500 receives the LVGO from the vacuum distillation zone 100 and a stream 632 usually including a coker gas oil from the coking zone 600, as described hereinafter.

The fluid catalytic cracking zone 500 can include a fluid catalytic cracking reactor operating in a riser or a downer mode. Optionally, the fluid catalytic cracking reactor can optionally include a regenerator. The fluid catalytic reactor can contain any suitable catalyst, such as a catalyst including a suitable refractory inorganic oxide carrier, such as alumina or silica, and optionally one or more metal or metallic components. The fluid catalytic cracking reactor can operate at any suitable condition, such as a pressure of about 130-about 1,200, kPa, a temperature of about 400-about 600° C., a catalyst-to-oil ratio of about 1-about 10, a weight hourly space velocity of about 1-about 50, hour$^{-1}$, and a residence time of about 0.5-about 60 seconds. An exemplary fluid catalytic cracking zone and catalyst are disclosed in U.S. Pat. No. 4,632,749.

The fluid catalytic cracking zone 500 can produce an effluent 504 usually including a fuel oil and a stream 508 typically including gasoline and other light products. The effluent 504 can be combined with a stream 624 usually including a residual fuel oil stream that can originate from the coking zone 600, as hereinafter described. The combined fuel oils can serve as a feed 536 to the second fractionation zone 540.

The second fractionation zone 540 can include one or more distillation columns. The second fractionation zone 540 can receive a feed 536 and produce several streams, namely an overhead stream 544 that typically includes a liquid petroleum gas (hereinafter may be abbreviated "LPG"), a first sidestream 546 that usually includes a naphtha, a second sidestream 548 that often includes an LCO, and a bottom stream 550 that often includes a clarified slurry oil (hereinafter may be abbreviated "CSO").

The LCO from the second sidestream 548 can be a petroleum fraction boiling in the range of about 200-about 400° C. and may include one or more aromatic compounds, particularly a plurality of aromatic compounds having at least one compound with one aromatic ring and at least one compound with 2-3, fused rings. The second sidestream 548 can be split with a stream 554 routed to product storage or additional processing, such as a diesel hydrotreating zone, and a stream 556 that may also, in turn, be split into streams 560, 566 and 204. The stream 560 can be routed to product storage, such as fuel oil, and receive a stream 208, which can contain LCO with desorbed PNAs from the adsorption zone 200. The stream 566 may pass through a valve 570 and enter the hydrocracking zone 120, as described above. The stream 204 can be used to desorb in the adsorption zone 200, as further described below.

The coking zone 600 can receive the vacuum residue 116 from the vacuum distillation zone 100 and include a coker operating at any suitable condition to thermally decompose one or more solid organics. An exemplary coking zone is disclosed in U.S. Pat. No. 4,118,281. Typically, the coker can operate at a temperature of about 400-about 550° C. The coking zone 600 can produce a coke product stream 608, an unsaturated vapor stream 616, the residual fuel oil stream 624, and the coker gas oil stream 632.

Figure 2:
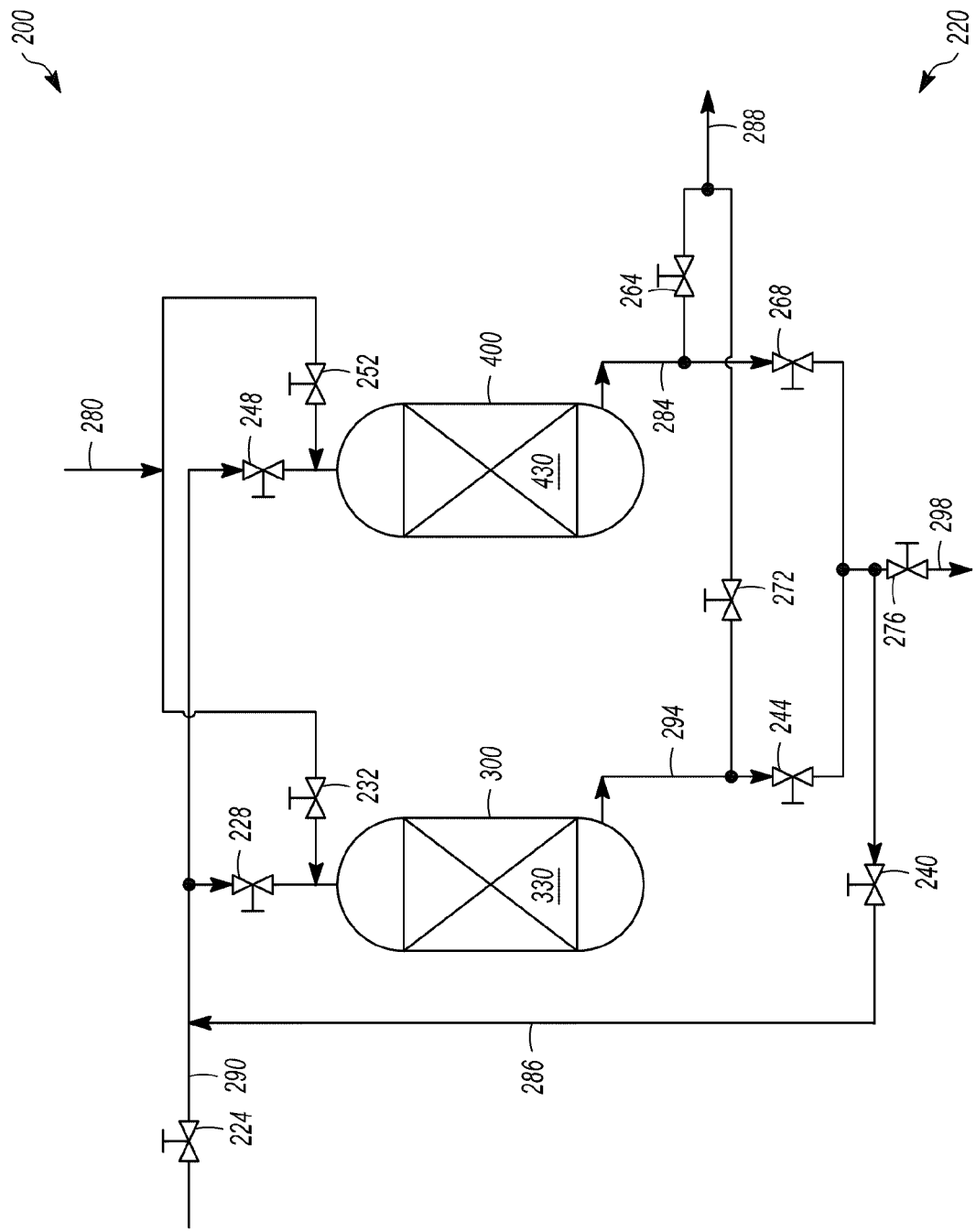
FIG. 2 is a schematic depiction of the exemplary adsorption zone.

Referring to FIG. 2, an exemplary adsorption zone 200 can include one or more valves 220, a first vessel 300, and a second vessel 400. The first and second vessels 300 and 400 can contain, respectively, a first adsorbent bed 330 and a second adsorbent bed 430. The first vessel 300 and the second vessel 400 can be swing bed adsorbers, in a parallel or series configuration, and alternate with adsorbing and desorbing. The beds 330 and 430 can contain an adsorbent and define an adsorbent volume. The one or more valves 220 can include valves 224, 228, 232, 240, 244, 248, 252, 264, 268, 272, and 276, which may be alternated in open and closed positions to control hydrocarbon flows through the adsorption zone 200.

The adsorbents in the first and second beds 330 and 430 can be, independently, a silica gel, an activated carbon, an activated alumina, a silica-alumina gel, a clay, a molecular sieve, or a mixture thereof. Preferably, the adsorbent is activated carbon. The adsorbent in the first and second beds 330 and 430 can be the same or different. The adsorption of PNAs can occur at any suitable condition, such as a pressure of about 170-about 4,300, kPa, a temperature of about 10-about 320° C., and a liquid hourly space velocity of about 0.1-about 500, hour$^{-1}$. The adsorption can occur in an upflow, a downflow, or a radial manner.

In one exemplary embodiment, a first stream 280 including a recycle oil having no more than about 10,000, ppm, by weight, along with one or more PNAs can be provided to the adsorption zone 200. In addition, a stream including an LCO can be provided via the stream 290. The first vessel 300 can receive the stream 280 to adsorb PNAs, and the second vessel 400 can receive the stream 290 to desorb PNAs. For this configuration, the valves 224, 232, 248, 268, 272, and 276 can be open and the valves 228, 240, 244, 252, and 264 may be closed.

As a result, the recycle oil stream 280 can pass through the valve 232 and into the vessel 300 to have PNAs adsorbed onto the adsorbent bed 330. Adsorption can be conducted in an upflow, a downflow, or a radial manner. Afterwards, the recycle oil can exit the vessel 300 via a stream 294 and pass through the valve 272 and exit the zone via the stream 288. Typically, the recycle oil stream exits the zone 200 with less, by weight, of one or more PNAs than the effluent 128 of the hydrocracking zone 120. The resulting recycle oil can be recycled to the hydrocracking zone 120, as described above.

The LCO stream 290 can pass through a valve 248 and into the vessel 400, which has adsorbent saturated with adsorbed PNAs. The LCO can desorb the PNAs. Desorption can be conducted in an upflow, a downflow, or a radial manner. A volume of the LCO stream can be at least about 10, , about 15, , about 20, , and even about 50, times the volume of the adsorbent bed 330 or 430 undergoing desorption for one or more PNAs. Although not wanting to be bound by theory, it is believed that 2-ring aromatic hydrocarbons are particularly advantageous for desorbing PNAs, as compared to aliphatic hydrocarbons, 1-ring and 4$^+$, -ring aromatics. The temperature for desorption is about 10-about 500° C., preferably about 100-about 300° C., and optimally about 150-about 250° C. with an LHSV of about 0.01-about 500, hr$^{-1}$, and a pressure of about 170-about 21,000, kPa, preferably about 1,100-about 2,000, kPa. Although not wanting to be bound by theory, it is preferable that the desorption is conducted under pressure to force the LCO into the pores of the adsorbent by capillary action and dissolve the PNAs. Generally, the adsorbent can be regenerated repeatedly, e.g., about 3-about 30, cycles or more before replacement. Thus, the amount of waste caused by replacing spent adsorbent can be reduced. The LCO stream now including desorbed PNAs can exit the second vessel 400 as a stream 284, pass the valves 268 and 276 to exit the adsorption zone 200 as a stream 298. As depicted in FIG. 1, this LCO stream containing desorbed PNAs can be combined with the stream 560 and routed to a fuel oil product storage.

After the first vessel 300 has reached its adsorption capacity of PNAs and the second vessel 400 has been desorbed, the one or more valves 220 can be repositioned from a closed to an open position. As such, the recycle oil may be routed through the second vessel 400 for adsorbing PNAs and routing the LCO through the first vessel 300 for desorbing.

Alternatively, the valves 224 and 276 can be closed and the valve 240 opened for recycling the LCO via a stream 286 through the second vessel 400 to continue desorbing. This allows maximizing the capacity of the desorbing LCO stream before routing the spent LCO stream to, e.g., fuel oil. It should be understood that additional lines and/or valves can be provided to operate the second vessel 400 with recycle LCO, to bypass the recycle oil around the first and second vessels 300 and 400, and to allow replacement of the adsorbent once the adsorbent is no longer regenerable.

In addition, an optional nitrogen or inert gas purge may be conducted after adsorption of PNAs and after regeneration to purge the adsorbent bed 330 or 430 of, respectively, a recycle oil and an LCO. Thus, the adsorbent bed 330 or 430 can be purged of recycle oil and an LCO before, respectively, regeneration or adsorption.

Figure 3:
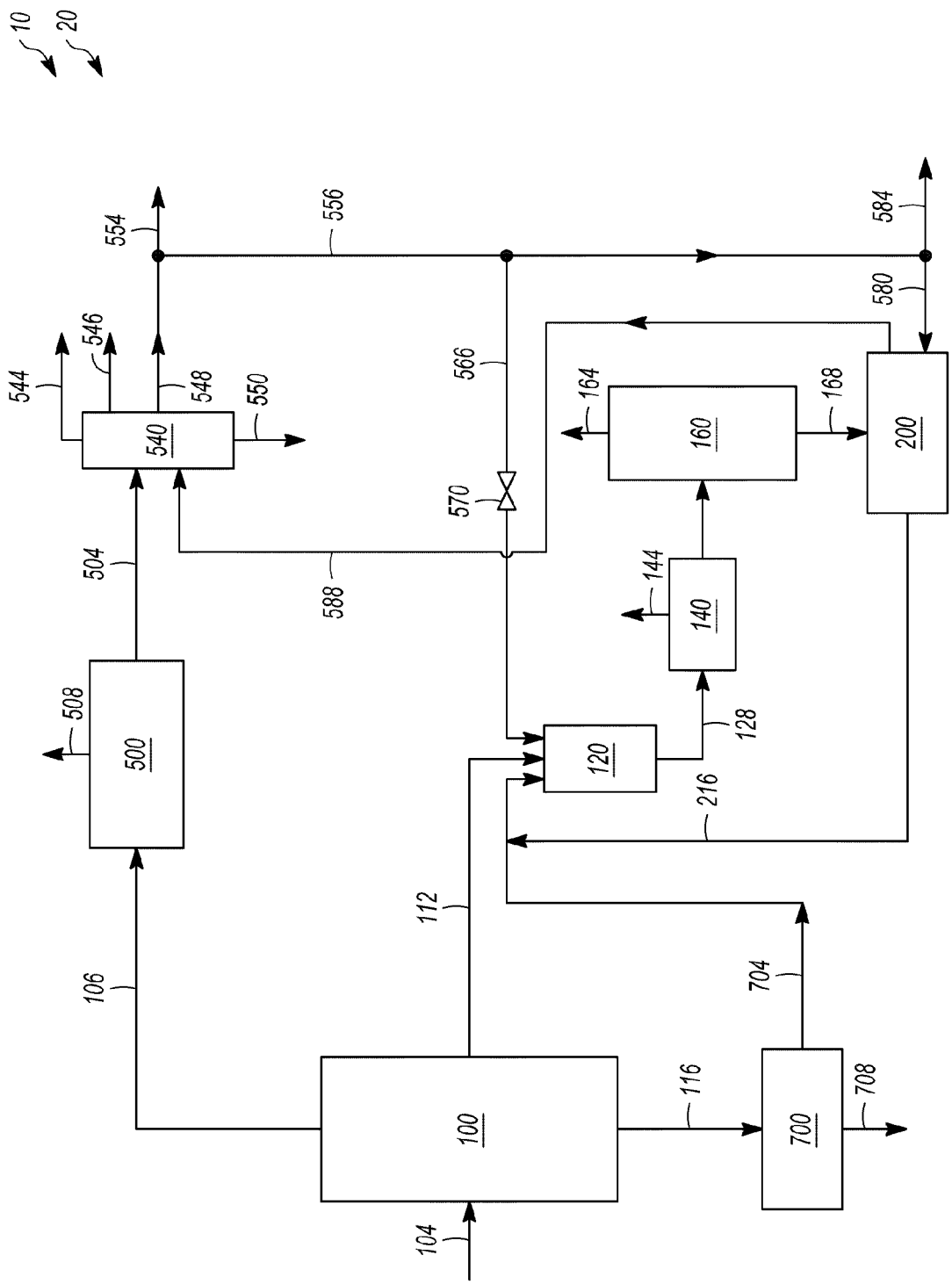
FIG. 3 is a schematic depiction of another exemplary refining or petrochemical manufacturing facility that includes the exemplary adsorption zone.

Referring to FIG. 3, another embodiment of the refining or petrochemical manufacturing facility 10 or the system 20 is depicted. In this exemplary embodiment, the vacuum distillation zone 100, the hydrocracking zone 120, the separation zone 140, the first fractionation zone 160, the adsorption zone 200, the fluid catalytic cracking zone 500, and the second fractionation zone 540 are similar as described above. However, instead of a coking zone 600, a deasphalter zone 700 may be used instead. The deasphalter zone 700 can receive the bottom stream 116 from the vacuum distillation zone 100 and produce a deasphalted oil stream 704 and an asphalt stream 708. An exemplary deasphalter zone is disclosed in U.S. Pat. No. 3,905,892.

In addition, the vacuum distillation zone 100 can provide a sidestream 112 including a combined waxy distillate. The sidestream 112 and a combination of the deasphalted oil stream 704 and the recycle oil stream 216 can be provided to the hydrocracking zone 120. Furthermore, the hydrocracking zone 120 may also receive the LCO stream 566, and can produce the recycle oil stream 168, as described above. Moreover, the fluid catalytic cracking zone 500 can receive the overhead stream 106, which in this exemplary embodiment can include a VGO.

With respect to the adsorption zone 200, the LCO stream 548 can be split into the stream 554 routed to product storage or further processing. Another portion 556 may be routed for use in the hydrocracking zone 120 or a stream 580 to the adsorption zone 200, as described above. Also, yet another part of the stream 556 can be routed as a stream 584 to product storage, such as fuel oil storage. However, instead of routing the LCO with desorbed PNAs from the adsorption zone 200 to fuel oil storage, a stream 588 from the adsorption zone 200 may be routed to the second fractionation zone 540. Thus, the PNAs can be separated from the LCO and at least a portion can be included with the CSO stream 550.

Illustrative Embodiments

The following examples are intended to further illustrate the subject embodiment(s). These illustrations are not meant to limit the claims to the particular details of these examples. These examples are based on engineering calculations and actual operating experience with similar processes.

The following experiments utilize a carbon adsorbent to remove PNAs from a recycle oil until the adsorbent is saturated with PNAs. Subsequently, the adsorbent is regenerated by washing. A subsequent adsorption is conducted to determine the effectiveness of the regeneration.

The following experiments are conducted with a stainless steel tube having an internal diameter of about 1.3, cm with a capacity of about 4, $cm^3$, of adsorbent. The feed and product lines can be at a temperature of about 100° C. A thermocouple having an outside diameter of about 0.5, cm is placed inside the tube. The feed line to the tube can alternatively provide recycle oil at a flow rate of about 15-about 17, grams/hour, or toluene or LCO at a flow rate about 75-about 150, grams/hour.

The utilized adsorbent is a bituminous carbon sold under the trade designation CPG by Calgon Carbon Corporation, Pittsburgh, Pa. Generally, the carbon has a diameter of about 0.425-about 1.4, mm, a surface area of about 899, $m^2$/gram, a pore volume of about 0.57, $cm^3$/gram, and a pore diameter of about 26, angstroms. In addition, the carbon can include about 16, ppm, by weight, nickel, about 18, ppm, by weight, vanadium, and about 1,040, ppm, by weight, iron.

The recycle oil that is adsorbed can have an American Petroleum Institute (API) rating of about 36.7, , a density of about 0.8404, $g/cm^3$, a sulfur content less than about 30, ppm, a nitrogen content less than about 1.5, ppm, and a nickel plus vanadium content less than about 0.01, ppm, by weight. However, three feeds of recycle oil can vary with respect to amounts and types of PNAs (typically $7^+$, fused-ring PNAs) as depicted in the following table:

TABLE 1

| Recycle Oil Feed | PNAs (ppm, by weight) | Coronene (ppm, by weight) | Methyl-Coronene (ppm, by weight) | Ethyl-Coronene (ppm, by weight) | Ovalene (ppm, by weight) |
|---|---|---|---|---|---|
| 1 | 1,203 | 546 | 486 | 170 | 1 |
| 2 | 1,740 | 1,000 | 574 | 156 | 9 |
| 3 | 1,720 | 1,000 | 525 | 176 | 18 |

COMPARISON EXAMPLE 1

Figure 4:
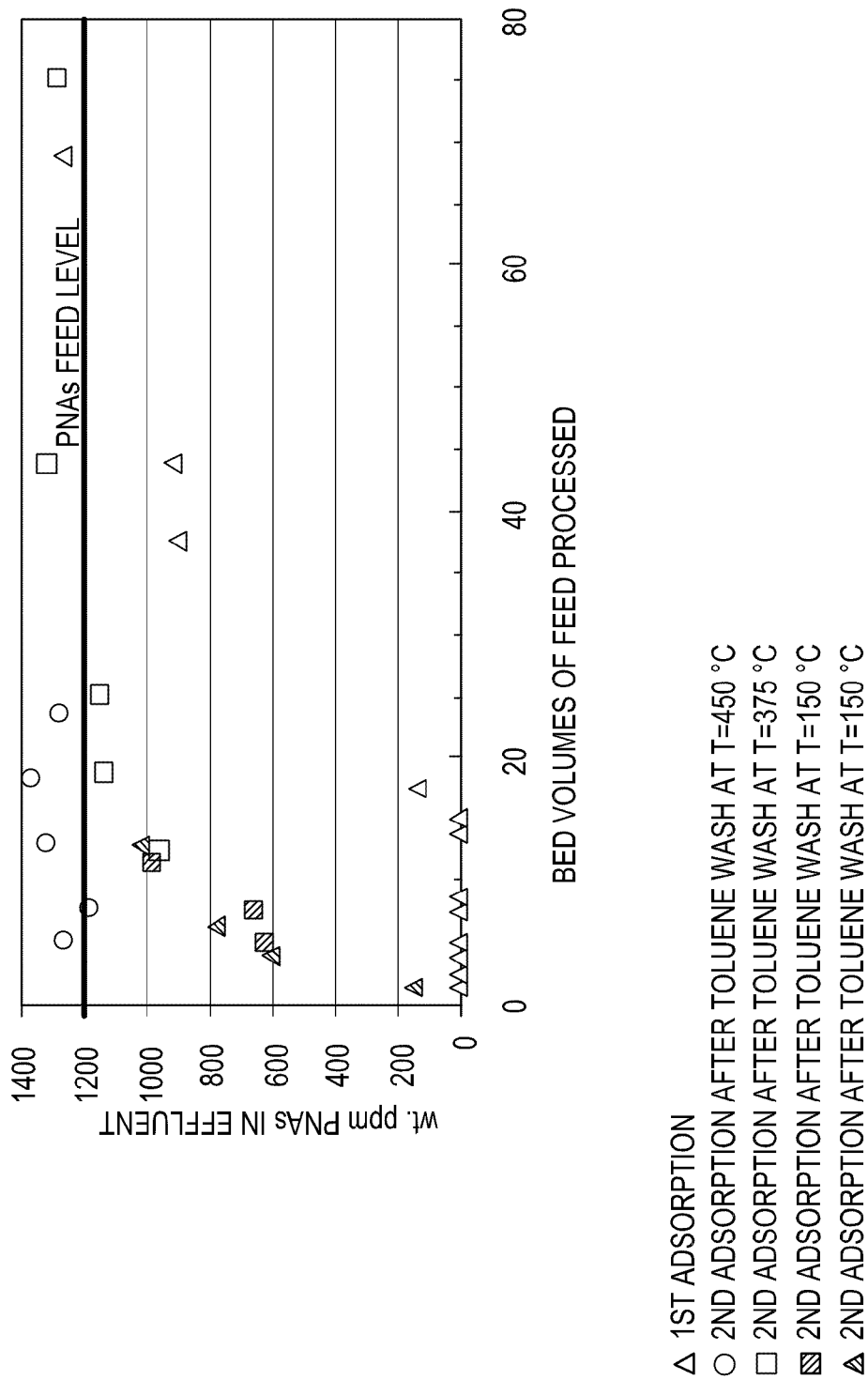
FIG. 4 is a graphical depiction of PNAs in an effluent per bed volumes of feed processed for a fresh carbon adsorbent and several carbon adsorbents washed with toluene.

Referring to FIG. 4, Recycle Oil Feed 1, is passed through about 7.2, grams of fresh carbon. The adsorption is conducted upflow at about 288° C. at atmospheric pressure at an LHSV of about 5, $hour^{-1}$. The effluent from the carbon is measured for PNA content. Breakthrough occurs at about 16, bed volumes with the carbon being saturated at about 70, bed volumes. Breakthrough is determined by measuring the PNAs in the effluent and observing a sharp rise in their concentration. The spent carbon weighs about 14.6, grams having a surface area of about 39, $m^2$/gram, a pore volume of about 0.06, $cm^3$/gram, and a pore diameter of about 58, angstroms. The spent carbon can have about 1,250, ppm, by weight, of PNAs.

Afterwards, four samples of substantially equal amounts are washed with about 150, bed volumes of toluene for about 5, hours at an LHSV of about 30, $hour^{-1}$, in an attempt to regenerate the carbon samples. Next, the four washed samples are separately placed back in the tube and used to adsorb PNAs at a temperature of about 288° C. from the recycle oil feed. The conditions for washing and subsequent adsorbing for the samples are depicted below:

TABLE 2

| | WASHING | | ADSORBING |
|---|---|---|---|
| SAMPLES | Temperature (° C.) | Pressure (kPa) | LHSV ($hour^{-1}$) |
| 1 | 450 | 100 | 10 |
| 2 | 375 | 100 | 30 |
| 3 | 150 | 100 | 5 |
| 4 | 150 | 800 | 5 |

As depicted in FIG. 4, toluene is ineffective at any of the times or pressures for regenerating the carbon. Particularly, breakthrough occurs at less than about 5, volumes of the bed and rapidly approaches the level of PNA in the feed.

EXAMPLE 1

Two spent samples are obtained from the example above. Particularly, fresh carbon adsorbent is saturated with PNAs by passing about 70, bed volumes of Recycle Oil Feed 1, through the adsorbent. The samples are washed with an LCO. The LCO includes 1-3, aromatic hydrocarbons, about 1.7%, by weight, sulfur, and about 673, ppm, by weight, nitrogen. Both samples are washed for about 5, hours at an LHSV of about 20, $hour^{-1}$. The conditions for washing the samples are depicted below:

TABLE 3

| | WASHING | |
|---|---|---|
| SAMPLES | Temperature (° C.) | Pressure (kPa) |
| 1 | 150 | 100 |
| 2 | 350 | 100 |

Approximately 99% of the desorbent LCO stream is in the liquid phase for desorbing Sample 1, , and approximately 94% of the desorbent LCO stream is in the vapor phase for desorbing Sample 2. The samples are placed in the tube and are used to adsorb PNAs from Recycle Oil Feed 1, at a temperature of about 288° C. and an LHSV of about 5, $hour^{-1}$.

Figure 5:
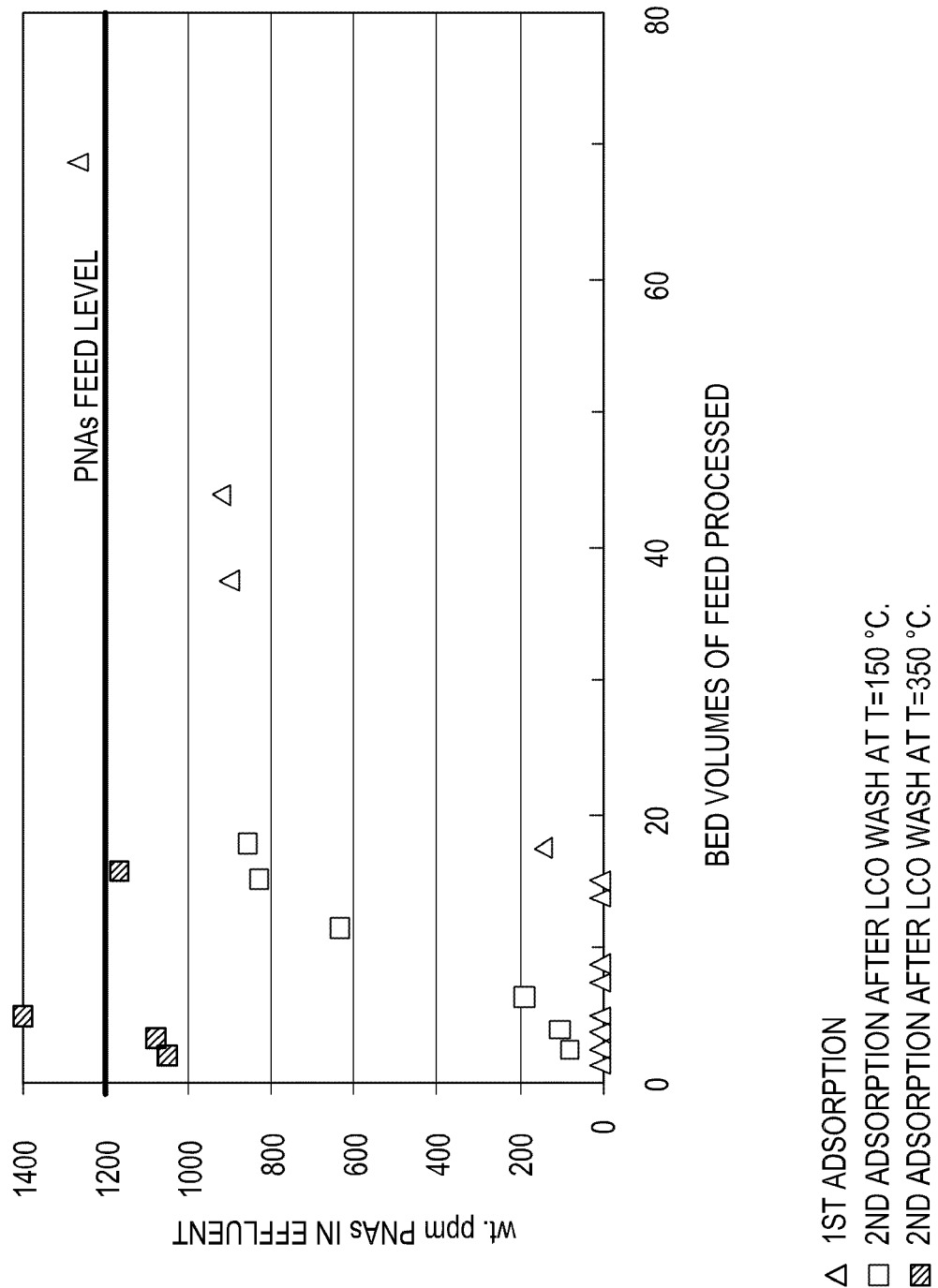
FIG. 5 is a graphical depiction of PNAs in an effluent per bed volumes of feed processed for a fresh carbon adsorbent and a couple carbon adsorbents washed with a light cycle oil (hereinafter may be abbreviated "LCO").

As depicted in FIG. 5, breakthrough occurs at less than about 10, bed volumes, with an almost immediate breakthrough for the sample washed at about 350° C. However, about 80-about 90%, by weight, of the PNAs are removed from the first about 5-about 6 feed bed volumes for Sample 1. Comparatively, only about 32%, by weight, of PNAs are removed from the feed by the fresh carbon adsorbent when breakthrough is reached at about 15, bed volumes. Also, after about 10, bed volumes, the LCO contains about 205, ppm, by weight, coronene, about 190, ppm, by weight, methyl-coronene, and about 72, ppm, by weight, ethyl-coronene, for Sample 1.

EXAMPLE 2

For the initial adsorption, the equipment and conditions are the same as the examples above. However, the Recycle Oil Feed 2, from Table 1, is used during the subsequent adsorption after regeneration. As depicted in Table 1, , the total amount of PNAs in the subsequent adsorption (about 1,740, ppm, by weight) is greater than the total amount of PNAs (about 1,203, ppm, by weight) in the initial adsorption with the fresh carbon.

After initial adsorption with Recycle Oil Feed 1, , a sample of adsorbent is washed with an LCO having about 15.3%, by weight, 1-ring aromatics, about 60.4%, by weight 2-ring aromatics, and about 10.1%, by weight, polyaromatics. The desorption takes place at a temperature of about 150° C., a pressure of about 1,100, kPa, a time of about 5, hours at an LHSV of about 20, hour$^{-1}$. About 99%, by weight, of the desorbent stream is in a liquid phase.

Figure 6:
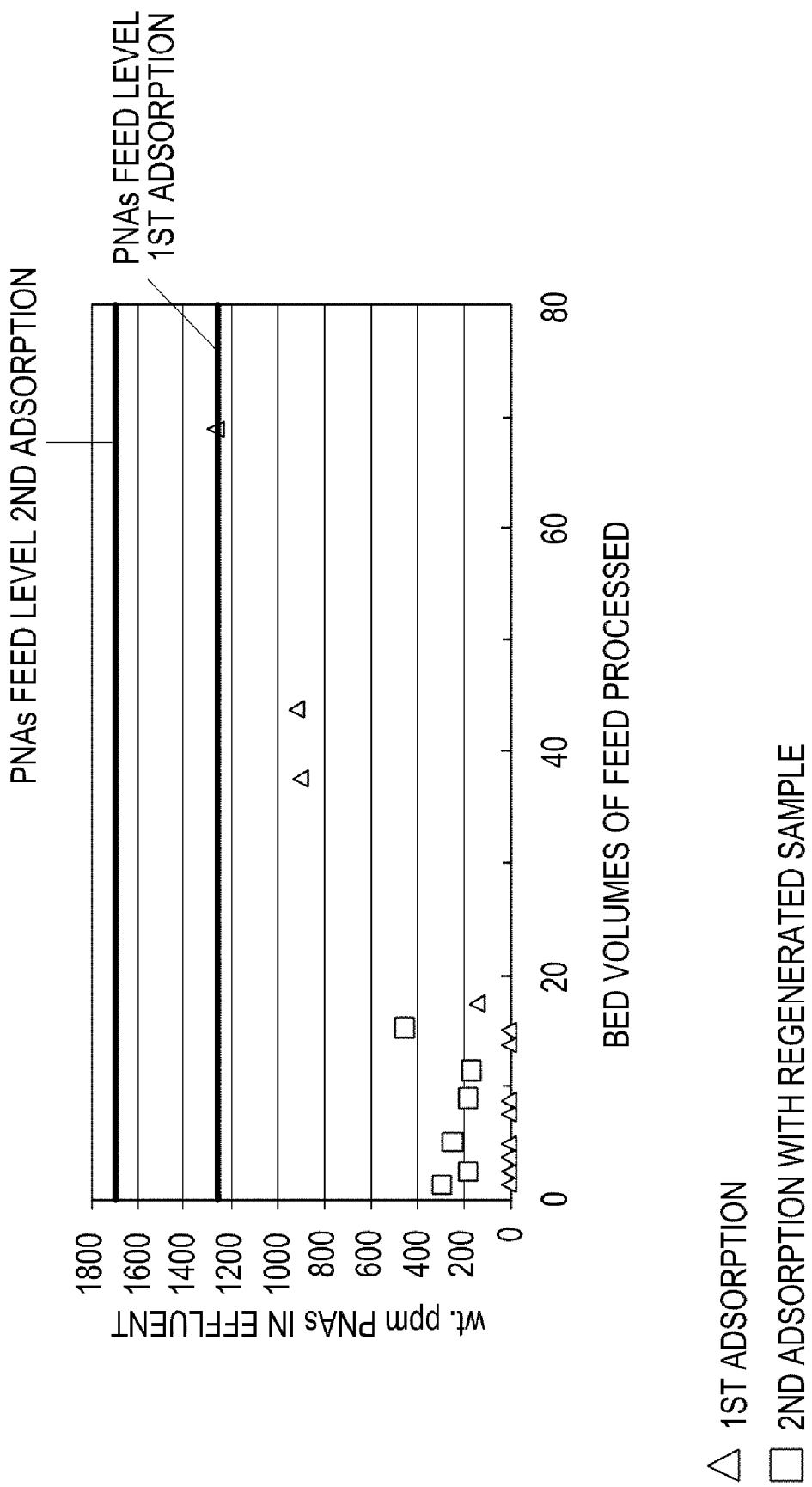
FIG. 6 is a graphical depiction of PNAs in an effluent per bed volumes of feed processed for a fresh carbon adsorbent and a carbon adsorbent washed with LCO.

After the wash is completed, a subsequent adsorption is conducted at about 288° C. at an LHSV of about 5, hour$^{-1}$, with the Recycle Oil Feed 2. As depicted in FIG. 6, both fresh and regenerated carbon can remove about 90%, by weight, of the PNAs up to about 15 bed volumes. After breakthrough, the fresh carbon only removes about 32%, by weight, of the PNAs from the feed, while the regenerated carbon still removes about 74%, by weight, of the PNAs from the feed. The higher level of overall PNAs in the effluent of the regenerated carbon as compared to the fresh carbon may be due to the higher level of PNAs in the recycle oil. However, the breakthrough of PNAs in the effluent from the regenerated carbon is comparable to fresh carbon.

EXAMPLE 3

Five consecutive adsorption and regeneration cycles are conducted on a carbon sample. The equipment and fresh carbon adsorbent are the same as the examples above. The adsorption is conducted at about 290° C. at about 100, kPa with an LHSV of about 3, hour$^{-1}$, on a fresh carbon sample with Recycle Oil Feed 3, from Table 1.

The desorption with LCO takes place at a temperature of about 150° C., a pressure of about 1,100, kPa, a time of about 6, hours at an LHSV of about 25, hour$^{-1}$. The carbon is washed with about 150, bed volumes of LCO. The LCO has the same percentages of aromatics as the LCO used in Example 2.

Figure 7:
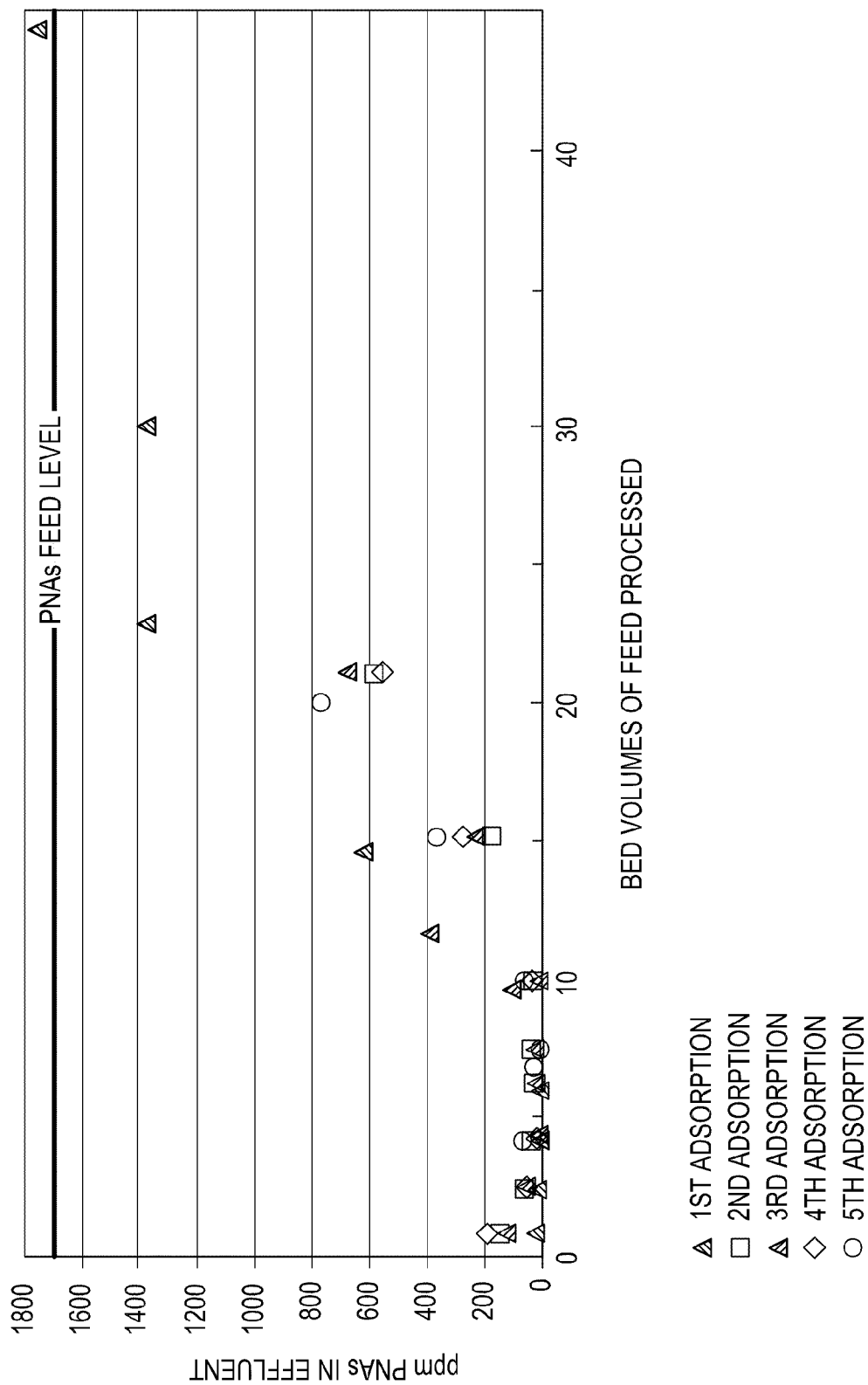
FIG. 7 is a graphical depiction of PNAs in an effluent per bed volumes of feed processed for a sample undergoing five adsorption/wash cycles with LCO.
Figure 8:
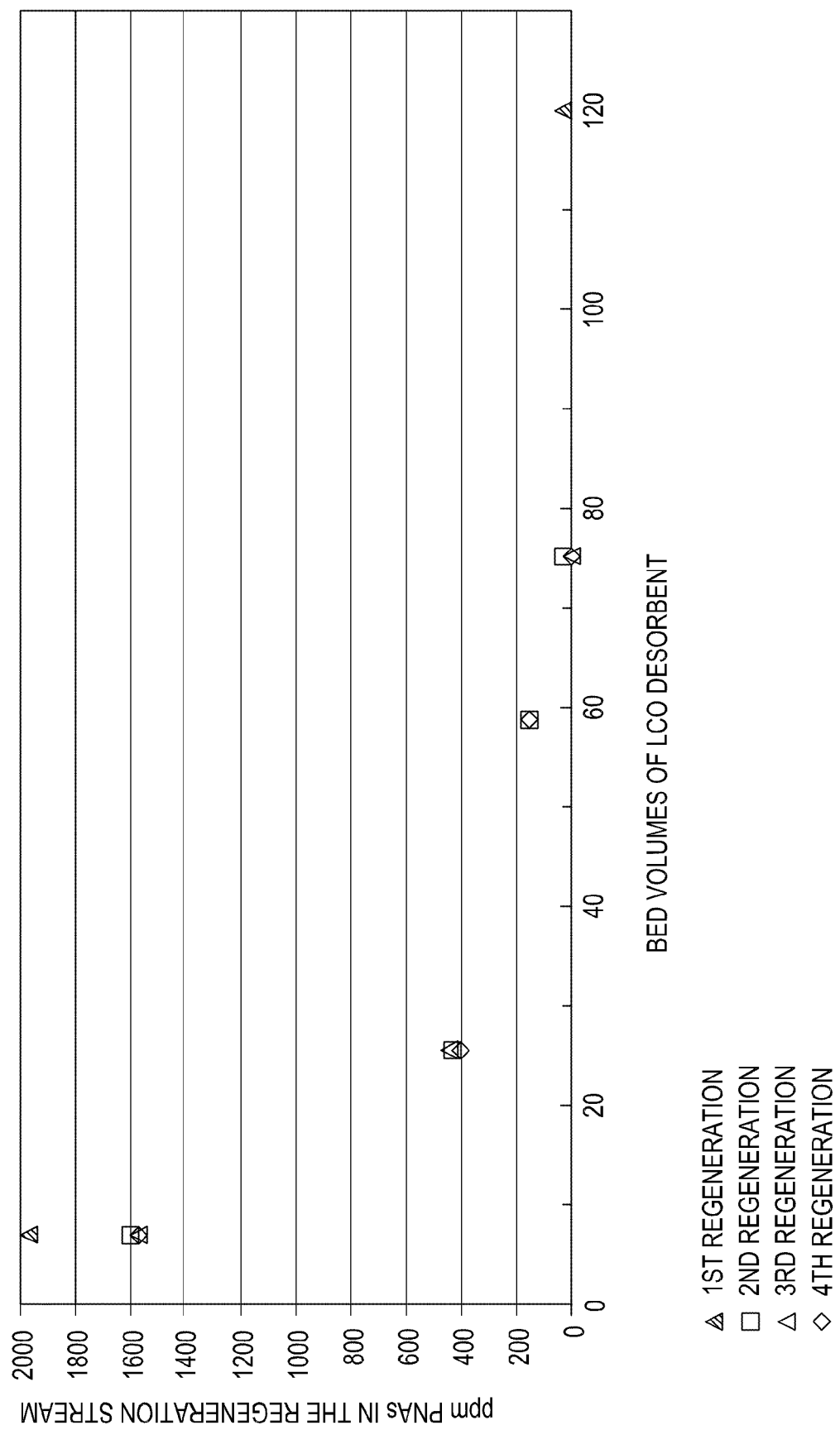
FIG. 8 is a graphical depiction of PNAs in a regeneration effluent per bed volumes of an LCO desorbent.

Referring to FIG. 7, the carbon can be completely regenerated for a total of 5 adsorption-regeneration cycles. As depicted, the carbon adsorption capacity is similar to the adsorption capacity of a fresh carbon sample. Referring to FIG. 8, after desorbing about 70-about 75, carbon bed volumes, the LCO desorbent stream contains no PNAs.

EXAMPLE 4

The carbon sample from Example 3, undergoes six more adsorption and regeneration cycles. However, the regeneration or washing is conducted for the subsequent cycles as depicted in Table 4, below:

TABLE 4

| Regeneration Cycle | Temperature (° C.) | Pressure (kPa) | LCO Bed Volumes |
|---|---|---|---|
| 6 | 150 | 1100 | 75 |
| 7 | 150 | 1100 | 30 |
| 8 | 150 | 1500 | 30 |
| 9 | 150 | 1500 | 30 |
| 10 | 200 | 1500 | 20 |
| 11 | 200 | 1800 | 20 |

Figure 9:
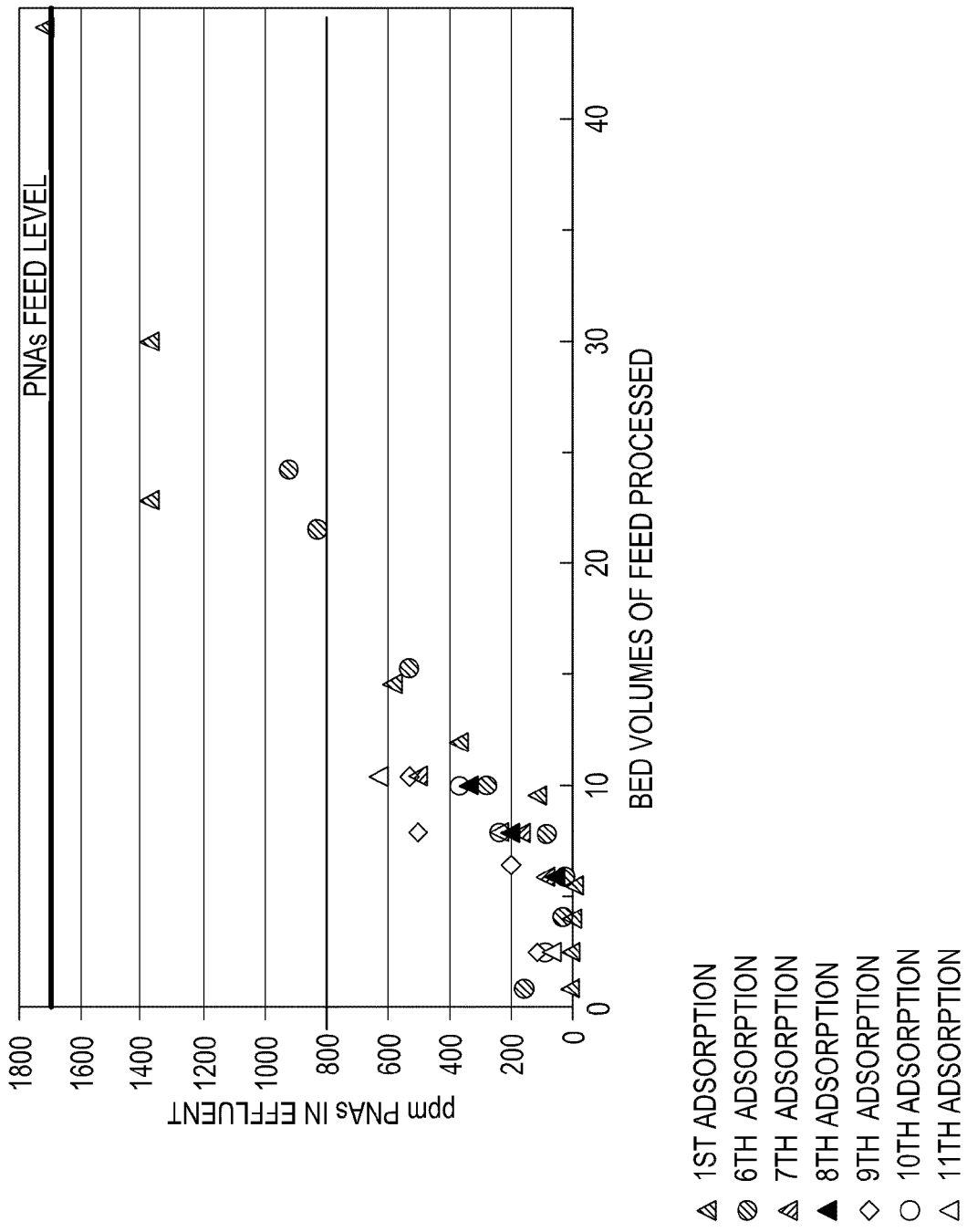
FIG. 9 is a graphical depiction of PNAs in an effluent per bed volumes of feed processed for a sample undergoing six additional adsorption/wash cycles with LCO with each regeneration being undertaken at different conditions.

Referring to FIG. 9, the graph demonstrates that it is possible to reduce the LCO desorbent volume to about 20, bed volumes if the regeneration is conducted at a higher temperature and optionally higher pressure. Again, breakthrough occurs between about 5-about 10, volumes. This duration of regenerated carbon capacity illustrates the feasibility of utilizing regenerated carbon after a multitude of regeneration cycles.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for desorbing one or more polynuclear aromatics from at least one fraction from a hydrocracking zone using an adsorption zone comprising first and second vessels, comprising:
   A) passing the at least one fraction from an effluent of the hydrocracking zone through the first vessel containing a first activated carbon; and
   B) passing a petroleum fraction comprising 2-ring aromatics boiling in the range of about 200-about 400° C. for desorbing the one or more polynuclear aromatics through the second vessel containing a second activated carbon.

2. The process according to claim 1, wherein a temperature for desorbing one or more polynuclear aromatics is about 10-about 500° C.

3. The process according to claim 1, wherein a temperature for desorbing one or more polynuclear aromatics is about 100-about 300° C.

4. The process according to claim 1, wherein a pressure for desorbing one or more polynuclear aromatics is about 170-about 21,000 kPa.

5. The process according to claim 2, wherein a pressure for desorbing one or more polynuclear aromatics is about 1,100-about 2,000 kPa.

6. The process according to claim 1, wherein a volume of the petroleum fraction for desorbing is at least about 10 volumes of a volume of the second adsorbent in the second vessel to desorb the one or more polynuclear aromatics from the second activated carbon.

7. The process according to claim 1, wherein the petroleum fraction is substantially in a liquid phase.

8. The process according to claim 1, wherein the petroleum fraction comprises one or more aromatic compounds.

9. The process according to claim 1, wherein the petroleum fraction comprises a plurality of aromatic compounds comprising at least one compound with one aromatic ring and at least one compound with 2-3 fused rings.

10. The process according to claim 1, wherein the petroleum fraction comprises a light cycle oil.

11. The process according to claim 1 wherein said polynuclear aromatics have at least seven rings.

12. A process for adsorbing one or more polynuclear aromatics, comprising:
A) an adsorption zone receiving:
1) at least one fraction from an effluent from a hydrocracking zone comprising one or more polynuclear aromatics adapted to pass through a first vessel containing a first activated carbon; and
2) a light cycle oil comprising 2-ring aromatics for desorbing one or more polynuclear aromatics from a second activated carbon contained in a second vessel;
wherein the light cycle oil comprising one or more desorbed polynuclear aromatics exiting the second vessel is passed downstream of a fluid catalytic cracking zone.

13. The process according to claim 12, further comprising recycling the light cycle oil to the second vessel before the light cycle oil exits the adsorption zone.

14. The process according to claim 12, further comprising:
a fractionation zone receiving an effluent from the fluid catalytic cracking zone, wherein the light cycle oil exiting the second vessel is combined with an effluent from the fluid catalytic cracking zone upstream of or to the fractionation zone.

15. The process according to claim 12, further comprising:
a fractionation zone receiving an effluent from the fluid catalytic cracking zone, wherein the light cycle oil exiting the second vessel is passed downstream of the fractionation zone for utilization as a fuel oil.

16. The process according to claim 12, further comprising:
a fractionation zone providing at least a portion of the light cycle oil to the second vessel.

17. The process according to claim 12, further comprising:
a vacuum distillation zone, providing:
a vacuum gas oil to the hydrocracking zone wherein the hydrocracking zone receives a recycle oil comprising less of one or more polynuclear aromatics from the adsorption zone than the effluent from the hydrocracking zone, and
a vacuum residue; and
a coking zone receiving at least a portion of the vacuum residue from the vacuum distillation zone.

18. The process according to claim 12, further comprising:
a vacuum distillation zone, providing a combined waxy distillate to the hydrocracking zone wherein the hydrocracking zone receives a recycle oil comprising no more than about 10,000 ppm, by weight, of one or more polynuclear aromatics from the adsorption zone and a vacuum residue; and
a deasphalting zone receiving at least a portion of the vacuum residue from the vacuum distillation zone.

19. The process according to claim 12 wherein said polynuclear aromatics have at least seven rings.

* * * * *